United States Patent [19]

Barron et al.

[11] 4,400,659

[45] Aug. 23, 1983

[54] METHODS AND APPARATUS FOR MAXIMIZING AND STABILIZING ELECTRIC POWER DERIVED FROM WIND DRIVEN SOURCE

[76] Inventors: Benjamin Barron, 1335 143rd St., Whitestone, N.Y. 11357; S. Chandrasekhara Rao, 15-47 Eberlin Dr., Fairlawn, N.J. 07410

[21] Appl. No.: 154,629

[22] Filed: May 30, 1980

[51] Int. Cl.³ .......................... H02P 9/14; H02P 9/30
[52] U.S. Cl. .................................... 322/32; 322/23; 322/25; 322/28; 322/35
[58] Field of Search ............... 322/28, 29, 32, 17–20, 322/23, 35, 25

[56] References Cited

U.S. PATENT DOCUMENTS

| | | | |
|---|---|---|---|
| 3,683,268 | 8/1972 | Obata | 322/28 X |
| 3,758,843 | 9/1973 | Ishizaki et al. | 322/25 |
| 4,245,182 | 1/1981 | Aotsu et al. | 322/25 X |

Primary Examiner—R. J. Hickey
Attorney, Agent, or Firm—Louis E. Mapn; E. M. Olstein

[57] ABSTRACT

The shaft of a wind turbine is connected to the rotor of a three-phase AC generator. The rotor windings, in turn, are connected to the rotor windings of a DC-energized, AC exciter via a differential frequency-converter. A frequency-detector, which monitors the output of the AC generator, is connected to the input of the frequency-converter to maintain the output of the generator at 60 Hz. A "real" power sensing circuit, connected to the output of the generator, develops a control signal which, when subtracted from a second control signal generated by a power management control circuit, maintains the power output of the generator at the maximum possible level for each particular power output from the wind turbine which drives the generator.

13 Claims, 1 Drawing Figure

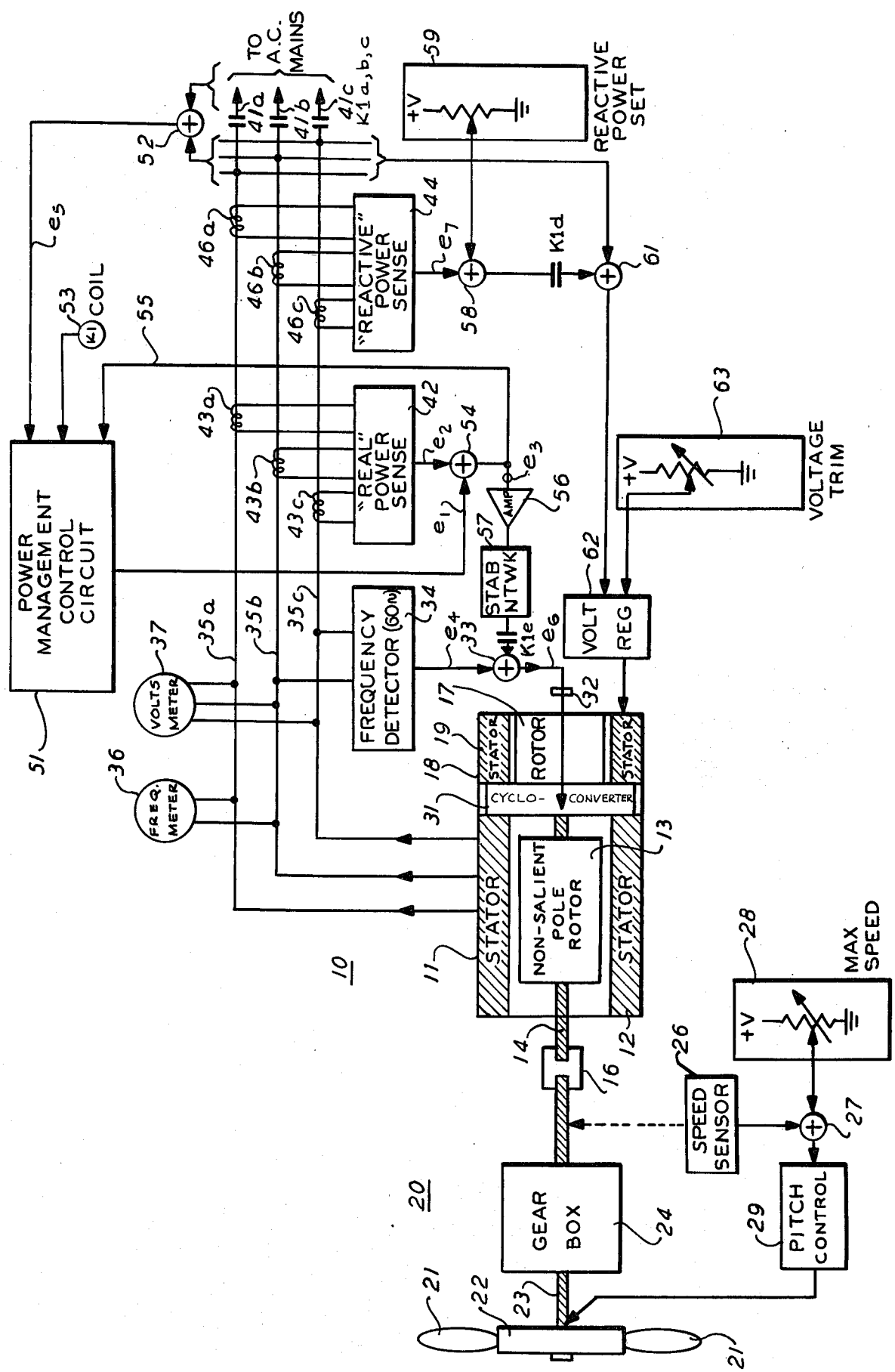

METHODS AND APPARATUS FOR MAXIMIZING AND STABILIZING ELECTRIC POWER DERIVED FROM WIND DRIVEN SOURCE

BACKGROUND OF THE INVENTION

1. Field of the Invention

Broadly speaking, this invention relates to the generation of electrical energy. More particularly, in a preferred embodiment, this invention relates to methods and apparatus for maximizing the power output of an electrical generator into an electric utility net which is driven by a source of variable power and speed.

2. Discussion of the Prior Art

Recent events have focused attention on alternate techniques for generating electricity. Among the systems that have been considered are wind turbines, hydroelectric generators and wave and tidal energy conversion devices. All of the above are characterized by the fact that the source which drives the generator is subject to long and short term variations in speed and power which, in turn, affects the frequency and power output of the generator.

By way of example, the following discussion will address the specific problem of generating electricity by the use of wind turbines. One skilled in the art will appreciate, however, that the invention is not so limited and has equal application to any field where the driving source is subject to fluctuation including, but not limited to, the aforementioned hydroelectric, wave, and tidal energy generation systems.

In its broadest aspect, the problem to be solved is the generation of stable electric power from an unstable energy source. According to the invention, the solution to this problem comprises an externally-controlled, electronic, differential-frequency corrector that may advantageously be mounted within the generator housing itself.

As is well known, the development of practical, wind-powered generating systems create problems which are simply not encountered in the development of conventional power systems. Some of these problems arise from:

1. the natural instability of the wind; and
2. the relationship between the velocity of the tip of a turbine propeller and the wind velocity and how this relationship affects the maximum energy that may be captured from the wind.

The first problem affects the nature and quality of the electricity produced while the second problem affects the cost of the electricity produced. Because of these factors, it quickly becomes apparent that, in order to achieve the desired system optimization, it would be necessary to design a new kind of generator for use with wind turbines.

Now, in the design of such a generator system one must not forget that, for reasons for performance and cost effectiveness, the synchronous generator has already been determined to be the best choice for wind-driven power systems. For example, a present NASA-sponsored, wind turbine program calls for an 1800 r.p.m., wound-rotor, salient-pole generator. When operating in parallel with an existing power system this generator must, of course, stay in synchronism with the existing system. Thus, the shaft speed of the generator and, hence, the speed of the turbine, must remain constant over all ranges of operating wind speeds.

Now, the power which is delivered by a wind turbine to a commercial power system, which runs at constant speed, is determined by the torque produced by the turbine. The turbine, in turn, is typically controlled by a power command signal which is fed to the turbine propeller pitch servos. Because of stability considerations, this control loop must be operated with a limited bandwidth and, thus, is not capable of responding adequately to transient power surges.

The above factors result in the following conditions:

1. system operation at a constant speed prevents the maximum energy capture from the wind because the ratio of the velocity of the tip of the turbine propeller to the wind velocity is maximized for only one wind velocity; and 2. the slow response of the turbine blade pitch control loop prevents suppression of torque fluctuations arising from wind gusts, tower shadow, or unwanted motion of the propellers. The resultant power surges in and out of the public power system may cause detrimental disturbances in the network grid.

SUMMARY OF THE INVENTION

As a solution to these and other problems, the instant invention comprises a generator system which will simultaneously provide constant frequency and phase control even when operating with variable-speed wind turbines.

The preferred embodiment comprises a 60 Hz generator system which achieves substantially increased capture of wind energy plus improved output power, both real and reactive as well as a high degree of stability. When installed on an existing 200 kw wind turbine facility, for example, it is expected that the output power will be increased, at higher wind velocities, from 200 kw to as much as 300 kw, without exceeding the torque rating of the tower.

More specifically, in a preferred embodiment, the instant invention comprises:

an apparatus for maximizing the power output of an electrical generator which is driven by a source of variable power and speed. The apparatus comprises an AC generator connected to and driven by the source, the generator having a rotor and a stator, an AC exciter connected to and driven by the shaft of the AC generator, and a differential frequency converter interposed between the rotor windings of an AC exciter and the rotor windings of the AC generator. The apparatus is more specifically characterized by means for generating a first control signal tending to increase the power output of the AC generator, means, connected to the output of the AC generator, for developing a second control signal proportional to the "real power" developed by the AC generator, and means, connected to the first and second control signal generating means, for generating an error signal proportional to the algebraic difference between the first and second control signals, the error signal tending to modify the phase of the generated voltage by momentarily reducing the frequency of the AC generator when the first control signal attempts to command an output power which is higher than the output power currently possible given the existing power that can be delivered by the source of power.

The invention and its mode of operation will be more fully understood from the following detailed description when taken with the appended drawing in which:

BRIEF DESCRIPTION OF THE DRAWING

FIG. 1 is a schematic diagram of an illustrative wind turbine generator system according to the invention.

DETAILED DESCRIPTION OF THE INVENTION

As shown in FIG. 1, generator system 10 comprises a main power generator 11 including, illustratively, a 4-pole, 3-phase stator 12 and a 4-pole, 3-phase, non-salient rotor 13.

One end of the shaft 14 of rotor 13 is connected to, and driven by, a wind turbine 20. Turbine 20, per se, forms no part of the instant invention and is shown in FIG. 1, in greatly simplified form, merely to set the operating environment for the invention.

As shown, turbine 20 comprises a plurality of propeller blades 21 connected, via a pitch adjusting device 22, to a turbine shaft 23. Shaft 23 is coupled to shaft 14 via a gear box 24 and some suitable coupling device 16. A speed sensor 26 is coupled to the output side of gear box 24 to measure the speed of the propeller blades 21. The output of sensor 26 is connected to one input of a comparator 27, the other input of which receives a maximum speed set signal from an adjustable reference source 28. The output of comparator 27 is applied to the input of a pitch control circuit 29 which, in turn, is connected to and controls the propeller pitch adjusting device 22.

The other end of shaft 14 is connected to the rotor 17 of an, illustratively shown, AC exciter 18 which receives DC field excitation via stator windings 19. A differential frequency converter 31 is interposed between the output of rotor 17 of exciter 18 and rotor 13 of generator 11. The differential frequency converter, sometimes known as a "cyclo-converter," includes a power thyristor bridge (not shown) and produces a controlled 3-phase, reversible, low frequency AC power signal. The frequency of this AC power signal is controlled to be exactly the algebraic difference between the desired output frequency (e.g. 60 Hz) and the actual frequency produced by rotation of the turbine shaft. In addition, converter 31 produces any needed phase corrections by momentarily advancing the phase of the AC signal, and then returning to its steady state value.

Converter 31 is designed to generate a 3-phase, sinusoidal output signal of essentially a "constant volt-second" characteristic to drive the AC rotating field of generator 11. However, as the difference between the desired output frequency and the actual output frequency approaches zero, converter 31 changes in to a current source to sustain DC excitation. The magnitude of the differential AC signal generated by converter 31 is, of course, a function of the DC excitation of the stator field 19 associated with AC exciter 19.

The DC control signal input to converter 31, e.g. voltage $e_6$, is obtained, via slip rings 32, from the output of a comparator 33 which has as one input the DC voltage $e_4$ obtained from the output of a 60 Hz frequency detector 34. Detector 34 in turn, is connected across output lines $35_b$ and $35_c$ of the 3-phase output $35_{a,b,c}$ from generator 11.

As shown, a frequency meter 36 and a 3-phase, AC voltmeter 37 are connected across the 3-phase output lines $35_{a,b,c}$ from generator 11. Output lines $35_{a,b,c}$ in turn, are connected to lines $41_{a,b,c}$, respectively, of the 3-phase AC mains, via contacts $K1_{a,b,c}$ of a relay K1. A first power sensing circuit 42 is connected to power lines $35_{a,b,c}$ via a corresponding plurality of current transformers $43_{a,b,c}$, respectively. In like manner, a second power sensing circuit 44 is connected to power lines $35_{a,b,c}$ via a corresponding plurality of current transformers $46_{a,b,c}$, respectively.

When contacts $K1_{a,b,c}$ are closed, so that power flows from generator 11 to the AC mains, the current sensed by current transformers $43_{a,b,c}$ flows into sensing circuit 42 to generate a DC signal, e.g. the voltage $e_2$, which is proportional to the in-phase component of the line current, i.e. the "real" power flowing out of generator 11. In like fashion, power sensing circuit 44 generates a DC signal, e.g. the voltage $e_7$, which is proportional to the out-of-phase, or quadrature, component of the line current, e.g. the imaginary or "reactive" power flowing out of generator 11.

A power management control circuit 51 has its input, e.g. the DC signal $e_5$, connected to the output of a comparator 52 having a first set of inputs connected to output lines $35_{a,b,c}$ and a second set of inputs connected to the 3-phase AC mains lines $41_{a,b,c}$. Obviously, the signal $e_5$ will be proportional to the phase difference between the AC mains and the output of generator 11 and will vanish when generator 11 is synchronized to the AC mains. Control circuit 51 is connected to, and energizes, the armature coil 53 of relay K1. Control circuit 51 generates only one output signal, the power delivery command ramp signal $e_1$. Ramp signal $e_1$ is compared with the signal $e_2$ from power sensing circuit 42 in a comparator 54 to form the error signal at the input to operational amplifier 56. Error signal $e_3$ is also fed back, via line 55, as an input to power management control system 51. The output of amplifier 56 is connected to a stabilizing network 57, thence to the other input of comparator 33, via relay contracts $K1_e$.

The output signal $e_7$ from power sensing circuit 44 is connected to one input of a comparator 58 which receives on its other input a reactive power set signal e.g. which may be set so that generator 11 produces either a unity or a leading power factor, as desired. This set voltage is shown as coming from a setting circuit 59 but may, if desired, be generated by control circuit 51. The output signal $e_9$ of comparator 58 is connected, via relay contacts $K1_d$, to one input $e_{10}$ of a comparator 61 whose other input is connected to the power output lines $35_{a,b,c}$. The output $e_{11}$ of comparator 61 is connected to one input of a voltage regulator 62 which supplies the DC excitation to stator winding 19 of AC exciter 18. Voltage regulator 62 also receives an input signal $e_{12}$ from a voltage trim circuit 63 which is adjusted to trim the output of generator 11 for paralleling the output of generator 11 with the AC mains.

It will be apparent from the above description and the schematic drawing shown in FIG. 1, that in the instant invention wind turbine control and electrical control of the power generation are functionally separated. As will be explained, any electrical disturbances that result from steady state or transient speed changes in the wind turbine will be automatically compensated for by the control system to be described.

The block diagram of FIG. 1 shows the system before it is connected to supply power to the AC mains. For the sake of brevity, the details of the automatic paralleling control which would normally be used are not shown in the drawing.

Let us consider now that start-up sequence for an illustrative generating system according to the invention. First, generator 11 is isolated from the AC mains by opening relay K1 if it is not already opened. Next, the turbine blades are set at maximum pitch and the turbine brake released so that the turbine runs up to speed. If the turbine should reach its maximum allowable speed, the pitch control circuit 29 will be automatically engaged to limit further speed increases.

Next, the generator flashes and the frequency control circuitry, including frequency detector 34, will maintain the output frequency of generator 11 fixed, equal to the electric utility, say 60 Hz. Voltage regulator 62 will maintain the output voltage of generator 11 at substantially the voltage of the AC mains. Finally after a short time delay to allow the system to settle down, power management control circuit 51 "looks" at signal voltage $e_5$ to determine when $e_5$ falls to zero, i.e. when generator 11 is synchronized to the AC mains.

Let us now consider the sequence of the connection of generator 11 to the AC mains. Because the output frequency of generator 11 is on internal control, via frequency detector 34, the generator will always be at a slightly different frequency than the AC mains. Because of the frequency stability of detector 34, the relative phase angle between the two voltages will advance at a slow rate and power management control circuit 51 waits until the relative phase passes through zero. At this instant, the management control circuit energizes relay K1 and the generator will now synchronize to the AC mains.

When K1 is energized, the K1 contact inserts a phase control signal from comparator 54 to offset the output signal $e_4$ from frequency detector 34. This action closes the output power control loop to the power delivery command ramp signal $e_1$ from control circuit 51. The initial value of the power delivery control ramp signal is zero. Therefore, the power delivered to the AC mains is maintained at zero by virtue of the closed loop signal $e_3$ which is equal to $(e_1-e_2)$ and held near zero.

We shall now consider the acquisition and maintenance of the maximum power output state. After a short time delay to again allow the system to settle, management control circuit 51 releases the power delivery command ramp signal $e_1$ which increases slowly from its original zero state. The in phase component of generator output current, and hence the output power, is sensed by the sensing circuit 42. The signal $e_2$ is then compared to the signal $e_1$ and the resulting difference signal $e_3$ is amplified and fed through the dynamic stabilizing circuit to inject an offset signal to the frequency "error" voltage $e_4$ from detector 34 thereby to control the phase of the differential frequency converter 31. The frequency and phase of converter 31 must shift in such a manner as to keep $e_3$ small, thereby completing the power output control loop.

The power that is delivered to the AC mains is under full control of the power management control circuit. As the signal $e_1$ continues its upward rise, the power output follows in unison (the signal $(e_1-e_2)$ being equal to a small error). With the ever increasing load, the wind turbine will slow down, with the blades still set at maximum pitch.

The ramp voltage $e_1$ will continue increasing until the wind turbine is incapable of delivering more power. At this point, the error signal $e_3$ will start to increase and this fact will be detected by the management control circuit which will stop the ramp signal and decrement $e_1$ by a small step. Control circuit 51 will then monitor the signal $e_3$ and if $e_3$ does not return to its normal small value, $e_1$ will be decremented again and $e_3$ rechecked. When $e_3$ falls to its normal low value, the upward ramp of signal $e_1$ resumes until the limit of $e_3$ is again reached when the cycle will repeat. Thus, the system according to the invention, automatically searches, finds and holds around the point of maximum power transfer from the wind turbine for the given atmospheric conditions.

It will be noted that the above described system automatically adjust itself for maximum power output even when the atmospheric conditions vary. For example, if the wind velocity increases, the power output capability of the turbine also increases. However, the tight, closed loop, power output control circuit will not allow the generator output to surge and the increased turbine speed will have no immediate effect on the generator output being fed into the electric utility mains. The power delivery ramp signal, $e_1$ will simply advance further than previously until a new, higher power point is reached where the error signal $e_3$ exceeds its "normal" condition. The power management control circuit will then repeat the searching cycle noted above.

If, on the other hand, the wind velocity decreases, the power output capability of the turbine will fall. Because of the inertia of the blades, this drop in power capability does not occur instantaneously. However, the closed power loop is a fast response system, since there is virtually no inertia in the differential frequency converter. Eventually, the output of generator 11 will stop following the signal $e_1$. This condition is sensed by management control circuit 51 and signal $e_1$ is decremented downward until the power output command signal is low enough for the wind turbine to match the command. At this point, the peak power search pattern resumes hovering around the new lower energy level.

In actual operation, the system would continuously shift back and forth between the two previously discussed conditions—continuously searching for and finding the point of maximum wind energy capture. It should be noted that no wind speed information, actually measured or by computer simulation, is required by the control system. It should also be noted that the control of reactive power is not directly related to the amount of wind energy available. Power set circuit 59 may be adjusted so that zero reactive current is absorbed from the AC mains, or the reative current control cuircuit 59 may be tied in with the power management control circuit to supply leading "reactive" current in inverse proportion to "real" power delivered so that the wind turbine may still do useful work at low wind operating conditions, while at the same time utilizing the full KVA capacity of the generator.

At this point, the operation of the differential frequency control should be examined. When the turbine driven generator is operating singly, turbine propellers 21 rotate with a velocity that is a function of the available wind. This, in turn, causes rotor 13 to rotate at an uncontrolled speed. Initially, the frequency on output lines $35_{a,b,c}$ is detected by frequency detector 34 to determine whether or not the output frequency is above or below the desired 60 Hz. In the event that the output frequency is less than 60 Hz, frequency detector 34 will produce the error signal $e_4$, which is a DC signal proportional to the frequency difference. Error signal $e_4$ is fed into the differential frequency converter 31 which modifies the 3-phase output of rotor 17 of exciter 18 to produce a desired input for the 3-phase rotor of generator 11.

The output of rotor 17 is an AC frequency which is related to the speed of the turbine, but it does not matter, for the purposes of this discussion, precisely what that frequency is. Of prime importance is the fact that the AC exciter generates a 3-phase output at a certain power level which may then be utilized by rotor 13 of generator 11.

The differential frequency converter 31 modifies the frequency which is output from AC exciter 18 to produce the desired differential frequency for rotor 13 of generator 11. When rotor 13 has a differential frequency applied thereto, the output frequency from stator 11 will increase and this increase will be detected by frequency detector 34 which will then modify signal $e_4$ to produce a different differential frequency on the generator rotor 13. This feedback will continue until the frequency of the stator output approaches 60 Hz. Next, after the generator is connected to the utility mains, the frequency controlling signal receives an off-setting signal that is the amplified power difference signal e. Thus, since the frequency detector keeps the generator near 60 Hz, then the power control signal is always small.

By adjusting the voltage supplied to the DC winding 19 of AC exciter 18, the voltage from stator 12 of generator 11 is controlled. The apparatus is now connected to the AC mains and the other component parts of the circuit come into play. For example, the "real" power sensing circuit 42 senses the in-phase current in each output line, which is, of course, directly proportional to the real power flowing in the lines—either the power delivered to the AC mains or the power which is drawn from the AC mains by generator 11. But, as will be explained, if power were to be drawn from the AC mains, the system will back off so that power is never actually absorbed from the AC mains, except for the brief moment that it takes to let the circuit to readjust itself.

The "real" power sensing circuit 42 detects the current in each line without monitoring the voltage, since it may be assumed that the voltage is constant. Thus, by merely measuring the flowing current, the unit can measure the power being delivered. (In actual practice, the current in each phase is averaged to determine the overall amount of power that is being delivered.)

Initially, at time $t_0$, which is defined as the time when the apparatus is first connected to the AC mains, the power delivered to the supply lines and detected by the "real" power sensing power unit is zero. This power varies according to some function which is controlled by the power management control circuit. This function can be a linear change of power with respect to time or some other curve, as desired. The power delivered to the AC mains continues to increase until a certain point is reached at which the system becomes unstable. This point of instability occurs in the so-called "pull out" region, which is defined as that region where the power output produced by the turbine propellers is insufficient to satisfy the power output commanded by the management control circuit. The management control circuit, in the illustrative embodiment shown, is designed to command the maximum power to be delivered into the AC mains. The power commanded by the management control circuit is a function of the signal $e_1$ which, as we have discussed, may be a linear ramp, or a curve such as a square law curve.

When the management control circuit attempts to command the apparatus to produce more than the maximum level of power available from the turbine, the rotor of generator 11 tends to "pull out" of synchronism. This happens because the rotor tends to slow down dramatically if the power input provided by the wind is insufficient to produce the power output commanded by the power management control circuit. When rotor 13 moves out of synchronism, a large increase occurs in signal $e_3$ detected by the power management unit. The power management unit generates a drop in the value of $e_2$. This change in the $e_2$ signal will instantaneously tend to decrease the frequency and thus institute a rate of change of phase in the generator rotor which, in turn, tends to produce identical phase change rate in the stator output thereby decreasing the power in the output lines and, causing the apparatus to reduce the power delivered to the AC mains until $e_3$ falls to a low value inside the control zone of the feedback system.

At this point, the Power Management system circuit once again attempts to maximize the power delivered to the AC mains by reinstating the upward ramp. The constant interaction between the "real" power sensing circuit and the power and management control circuit assures that the system is always operating near the maximum power point.

The circuit disclosed in FIG. 1 is, in effect, designed to minimize the sum of the signals $e_1$ and $e_2$. As previously discussed, the $e_1$ and $e_2$ signals are combined to produce a signal designated $e_3=(e_2-e_1)$, which signal is fed back into the power management control circuit which then reduces the signal $e_1$. The error signal $e_3=-(e_2-e_1)$ also tends to reduce the frequency of generator 11, thereby reducing the power output to a lower level. This, in turn, reduces the value of $e_2$ again into the operating region, below the level of instability.

Error signal $e_3=(e_2-e_1)$ has the appearance of a down step function which has the effect of momentarily decreasing the frequency in the generator rotor, thereby pulling the system back into the control zone.

As previously discussed, paralleling to the utility is automatic. The system disclosed includes a comparator 52 for connecting the generating apparatus to the AC mains. Comparator 52 serves to compare the voltage, frequency and phase angle on the generator output lines to the corresponding parameters of the AC mains. When total coincidence is detected, the comparator causes the control circuit 51 to close the K1 circuit breakers in each output line, thereby connecting the generator to the AC mains, as desired. If all the parameters are equal, there is no load between the generator and the AC mains and the apparatus may, thus, be safely connected to the power lines.

Without the use of such a comparator, connection of the generating apparatus to the AC mains might produce large current and voltage transients which could be harmful. When coincidence is detected, comparator 52 generates a signal $e_5$ to the management control circuit 51 indicating that the apparatus has been connected to the AC mains and that the management control circuit should assume control. If signal $e_5$ becomes zero, indicating a coincidence of phase between the generator and the AC mains, the power management control system then closes relay K1, thereby connecting the apparatus to the AC mains.

The relay contacts denominated $K1_a$–$K1_b$ are all closed simultaneously when the apparatus is connected to the AC mains. This means that the "real" power sensing circuit and the reactive power sensing circuit are not connected to generator 11 until the apparatus itself is connected to the AC mains.

The real power sensing unit detects, in essence, the current in the lines that is in phase with the voltage (i.e. $I_1 \cos \theta_1$) while the reactive power sensing unit detects the current that is 90° out-of-phase with the voltage in the line (i.e. $I \sin \theta_1$). The reactive power sensing circuit normally performs no function unless a customer desires the circuit to perform, for example, as a power factor correction circuit. More specifically, if a particular customer has a large plant facility with several machines simultaneously in operation such that the overall current utilized by the plant has a lagging power factor, i.e. the current lags behind the voltage by a certain phase angle $\theta_1$, then the customer may desire that generator 11 produce a leading current to compensate for the existing lagging current. The reactive power sensing unit is designed to produce an error signal which is a functon of the amount of leading current desired, and this error signal serves merely to regulate the voltage in the voltage regulator which, as we have seen, is connected to AC exciter 18. Strictly speaking, the reactive power sensing circuit is not necessary for the proper functioning of this invention but is merely included for the sake of completeness. The reactive power sensing unit operates in much the same manner as a conventional power-factor correction unit. The stabilization network connected between the "real" power sensing circuit and the AC exciter serves to control the rate of correction signals so that adequate damping of the system is provided and voltage and frequency changes are made gradually.

An additional advantage of the present invention is that, in conventional wind turbine generators, the propellers are mounted for rotation about a horizontal axis that is typically on top of a tower. Generally, the propellers are mounted on the leeward side of the tower, which has been found to be the most efficient orientation. In this configuration, there is obviously a certain arcuate portion of the propeller's travel which is hidden behind the tower and, during that portion of travel, the propeller blades do not get any impetus from the wind. During this portion of blade travel then, the power output decreases noticeably so that the effect is to cause a repetitive series of perturbations in the power output curve occurring twice per revolution (assuming a two-bladed propeller). This also has an effect on the gears and other mechanical portions of the drive chain which are subjected to shock caused by the sudden change in power supplied to the propeller.

The present invention, however, smooths the output power curve from the generator, thus eliminating the perturbations and smoothing the shock to the gear box greatly improving the life and dynamics thereof. The invention smooths out the shock to the gear box by essentially relieving the strain on the gears caused by allowing the turbine slow down, i.e. by simultaneously slowing down the other end of the shaft which is connected to the generator.

Continuing the previous discussion concerning control signals $e_1$ and $e_2$, note that signal $e_1$ constantly strives to place a load on the generator and turbine propeller by continually advancing the phase angle (instantaneous frequency) with respect to the AC mains. When the system is loaded down, the turbine propeller turning say at 1,600 rpm, will drop to 1,500 rpm. The generator load on the propeller must then be relieved to allow the propeller to speed back up to 1,600 rpm. This is accomplished by decreasing the frequency in the generator rotor windings in accordance with a signal which is proportional to $(e_1 - e_2)$ i.e. the signal $e_3$. When the load is taken off the propeller, it will speed up to 1,600 rpm, for example, thereby increasing the power output at the stator of the generator, tending to bring back the system to its maximum power output.

There is a predetermined functional relationship between the power output of a particular turbine and the wind velocity—but this cannot be applied since the wind velocity on the blades cannot be determined with any assurance. The present invention avoids this problem. The power management control circuit of the present invention does not need to consider what the shape of this curve might be, because it continuously strives to have the system perform at its point of maximum output. If, however, when it is desired to operate the system at a point other than the maximum power point, i.e. when the available wind velocity can produce power beyond the rating of the turbine-generator, then the power management control system can be programmed to include a preset maximum in the ramp voltage, $e_2$.

The instant invention will have the following economic effects on wind turbine generated power. The turbine speed can now be changed as wind speed changes to accomplish maximum energy capture from the available wind. Thus, for a relatively modest increase in cost of the generator, significant financial rewards follow:

1. The basic cost of electricity is reduced since the net energy produced by a single wind turbine is increased;
2. A reduction of torque surges reduces the loading on the gear box and shaft, thereby opening a possibility of reducing their size and cost;
3. The suppression of power surges, which is always desired by utilities; and
4. In conditions of minimum wind speed, where the turbine can produce only a little power, it is still possible to apply the wind turbine as a "lossless" synchronous capacitor, supplying VAR's to the utility network.

A person skilled in the art may make various changes and substitutions to the layout of parts shown without departing from the spirit and scope of the invention.

What is claimed is:

1. An apparatus for maximizing power output of an electrical generator which may be driven by a source of variable power and speed and connected to AC mains lines under control of a power management circuit; and including an AC generator connected to and driven by said source, said generator having a rotor and a stator and having output lines for being connected to said AC mains lines;

a voltage-controllable AC exciter connected to and driven by the shaft of said AC generator; and a frequency-controllable differential frequency converter interposed between the rotor windings of said AC exciter and the rotor windings of said AC generator, the output frequency of said AC generator being proportional to the speed of said shaft plus the frequency of said frequency converter, which comprises:

means connected to said AC mains lines and to said output lines for generating a first control signal (e.g. $e_1$) tending to increase the power output delivered by said AC generator;

means connected to the output of said AC generator for developing a second control signal (e.g. $e_2$)

proportional to the "real" power developed by said AC generator;

means connected to said first and second control signal generating means for generating a first error signal (e.g. $e_3$) proportional to the algebraic difference between said first and second control signals for input into said power management control circuit;

means connected to the output of said AC generator for developing a second error signal (e.g. $e_4$) proportional to the difference in frequency between said AC generator and an internal frequency reference, said frequency reference being preset to be equal to the operating frequency of the electrical utility, to which the AC generator is to be connected;

means connected to said AC exciter responsive to said first and second error signals for changing the voltage induced in the rotor windings thereof;

means for connecting the output of said AC generator to said electric utility; and means connected to said frequency-controllable differential frequency converter and responsive to said second error signal for shifting the frequency of said frequency converter thereby to maintain said second error signal at a low value.

2. The apparatus according to claim 1 and further comprising means connected to said frequency-controllable differential frequency converter for shifting the frequency thereof, continuously or momentarily, to produce a change in the phase of the voltage produced by said frequency converter.

3. The apparatus according to claim 1 and further comprising means for holding said first control signal at a zero level until said AC generator connecting means is actuated, and means for isolating said first error signal from said second error signal until said AC generator connecting means is actuated.

4. The apparatus according to claim 1 and further comprising a voltage regulator connected to said AC exciter for providing a reference voltage for regulating the output voltage of said AC generator to the voltage level of said electrical utility.

5. The apparatus according to claim 1 and further comprising an amplifier and a stabilizing network connected between said first error signal generating means and said second error signal generating means.

6. The apparatus according to claim 4 and further comprising:

means for generating a third control signal (e.g. $e_8$);

means responsive to said third control signal tending to modify the reactive power delivered by said AC generator to the electrical utility, said reactive power being controllable from a leading phase angle, through zero, to a lagging phase angle in direct proportion to the magnitude of said third control signal;

means, connected to the output of said AC generator, for developing a fourth control signal (e.g. $e_7$) proportional to the "reactive" power developed by the said AC generator when said generator is connected to said electrical utility;

means, connected to said third and to said fourth control signal generating means, for generating a third error signal (e.g. $e_9$) proportional to the algebraic difference between third and fourth control signals; and means responsive to said third error signal for controlling the reactive current produced or absorbed by the AC generator by changing the excitation of the AC exciter.

7. The apparatus according to claim 6 and further comprising:

means for combining said third error signal with a reference voltage (e.g. $e_{12}$) of said voltage regulator to form a fifth control signal; and means responsive to said fifth control signal to modify the excitation of said AC exciter, upon modification of the excitation of said AC exciter and upon the sensed current lagging the desired, preset value for said fifth control signal, the signal output from said voltage regulator to the AC exciter increases.

8. The apparatus according to claim 7 wherein said AC exciter is functionally coupled to the rotor of said AC generator whereby the output voltage of said AC generator is in direct proportion to the voltage induced in the rotor of said AC generator by the output of the said differential frequency converter, said apparatus further comprising means for connecting said AC exciter to said differential frequency converter whereby the voltage produced by said differential frequency converter is directly proportional to the voltage produced by said AC exciter.

9. The apparatus according to claim 8 and further including means for increasing the output of said voltage regulator thereby to increase the voltage generated by said AC generator and producing an advancing power factor to keep said third error signal at a low value, said low value of the third error signal maintaining the reactive current delivered by said AC generator at a value determined by said third control signal.

10. The apparatus as defined in claim 1 and including means connected between the output of said AC generator and said electrical utility for producing a fourth error signal (e.g. $e_5$) proportional to the phase difference between said AC generator and said electrical utility.

11. A method of maximizing the power output by an AC generator assembly including a differential frequency converter which may be driven by a source of variable power and speed comprising the steps of:

generating a first control signal (e.g. $e_1$) tending to increase the power output of said generator;

generating a second control signal (e.g. $e_2$) proportional to the "real power" developed by said generator; and generating a first error signal (e.g $e_3$) proportional to the algebraic difference between said first and second control signals, said first error signal to produce in said differential frequency converter a controlled 3-phase, reversible, low frequency AC power signal tending to reduce the frequency of said AC generator when said first control signal attempts to command an output power higher than that currently possible given the existing torque developed by said source of power;

when the value of said first error signal increases beyond a level that corresponds to the maximum power limit of the source of variable power and speed, hence the point of saturation of the frequency-controlling capability of the differential frequency converter, halting further increases in said first control signal and forcing the same to fall at a controlled rate; and when the value of said first error signal falls into a zone corresponding to a non-saturated frequency-shifting capability for said differential frequency generator, forcing said first control signal to resume increasing in value.

12. The method according to claim 11 and including the further step of alternating the magnitude of said first control signal to maintain said error signal at a minimal value under all conditions of power and speed of said variable power source.

13. The method according to claim 12 and including the further steps of:
generating a second error signal (e.g. $e_4$) proportional to the difference in frequency between the output from said AC generator and an internal frequency reference; and
generating a signal tending to maintain the frequency of said AC generator at or close to a predetermined reference frequency before said AC generator is connected in parallel to an electrical utility.

* * * * *